May 30, 1961  H. A. LEFLET, JR  2,985,986
METHOD AND APPARATUS FOR CLEANING AND BENDING GLASS SHEETS
Filed Aug. 29, 1957  3 Sheets-Sheet 3

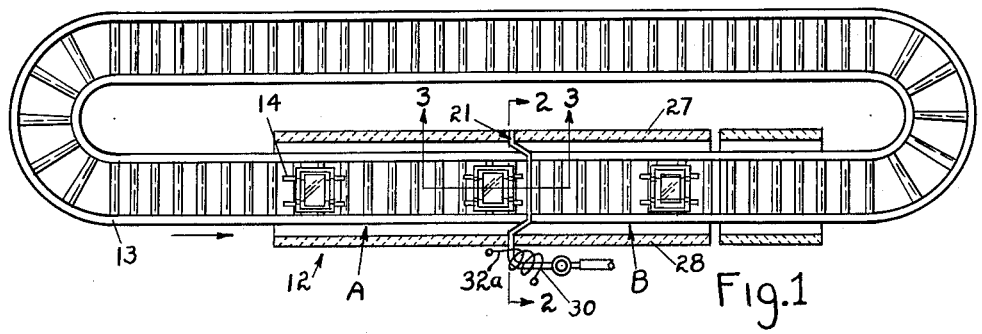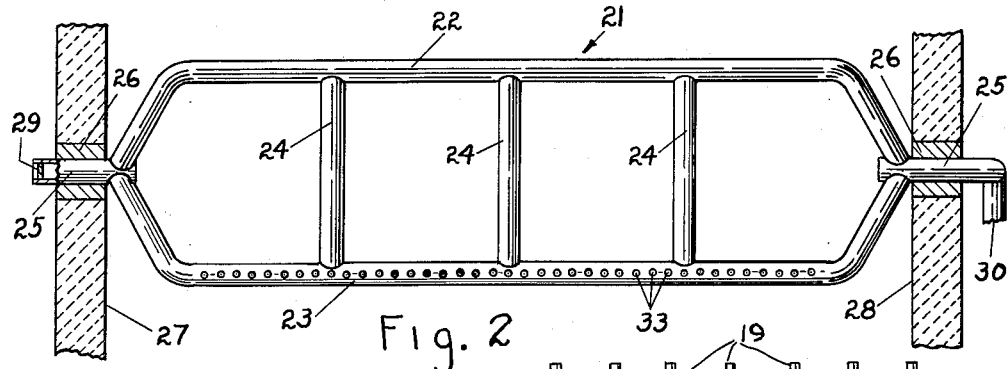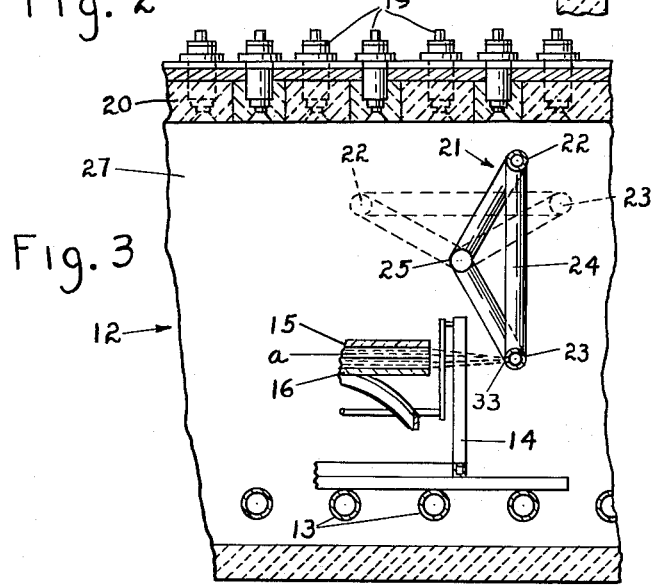

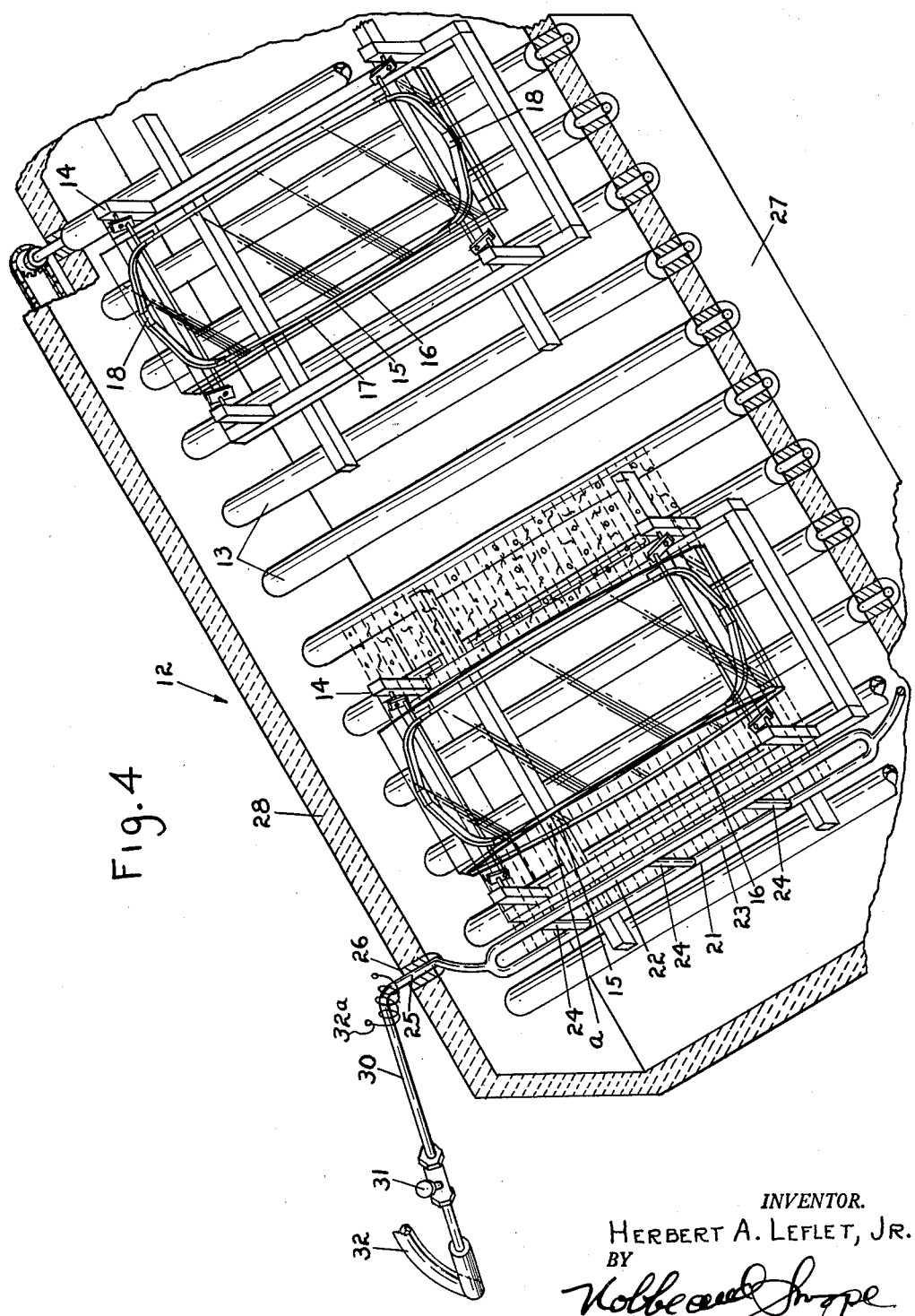

INVENTOR.
HERBERT A. LEFLET, JR.
BY
ATTORNEYS

United States Patent Office 2,985,986
Patented May 30, 1961

2,985,986

METHOD AND APPARATUS FOR CLEANING AND BENDING GLASS SHEETS

Herbert A. Leflet, Jr., Toledo, Ohio, assignor to Libbey-Owens-Ford Glass Company, Toledo, Ohio, a corporation of Ohio Filed Aug. 29, 1957, Ser. No. 681,005

17 Claims. (Cl. 49—7)

The present invention relates generally to the cleaning of glass sheets, and more particularly to a novel method and apparatus for cleaning facing surfaces of a plurality of glass sheets to be simultaneously bent.

It has been found that the most efficient manner of manufacturing a bent glass laminate, for example a windshield, is to bend both sheets of a given laminate at the same time so that the curvature of each of the sheets will be substantially identical. At the same time, however, the presence of foreign matter between the sheets has always been a problem since a certain percentage of bent sheets have had to be rejected because of pitting which is caused by foreign matter trapped between the sheets during the bending thereof.

In the production of severely bent sheets, the pitting problem becomes even more important since in order to make relatively sharp bends in portions of the sheets it is necessary that those portions be heated to a relatively high temperature and become more softened and thus are more susceptible to being marred by foreign material located between the sheets.

To partially eliminate the pitting problem, various new methods have been employed to scrub and wash the sheets of glass prior to a pair of sheets being mounted on a bending mold and bent into conformity therewith. In spite of all these precautions, the losses in severely bent sheets have been relatively high and in the case of certain bends have amounted to as much as 30%. This is believed to be due to the fact that during subsequent handling of sheets after washing a certain amount of foreign abrasive material becomes deposited on the surfaces thereof. This is particularly the case when the sheets are placed in contact with one another which usually causes some grating contact of sheet edges and results in minute particles of glass becoming entrapped between the facing sheet surfaces.

In accordance with the present invention, entrapped foreign material between a pair of glass sheets is removed by heating the sheets in such a manner that at least one of the sheets bows away from the other and leaves a gap therebetween, and then directing a stream of fluid, preferably air, through the gap between the sheets thus blowing out foreign material deposited on the facing sheet surfaces.

It is therefore an important object of the invention to provide an improved method and apparatus for cleaning the facing surfaces of a plurality of glass sheets.

Another object of the invention is to provide a method and apparatus for cleaning the facing surfaces of a plurality of glass sheets which are to be bent immediately prior to the bending thereof and while the sheets are hot.

A further object of the invention is to provide such a method and apparatus in which the sheet surfaces are heated to less than bending temperature and cleaned while not materially cooling the sheets so that they can be bent immediately thereafter.

A still further object of the invention is to provide improved apparatus for carrying out the method of the invention which may be installed within a continuous type furnace used in bending glass sheets.

Other objects and advantages of the invention will become more apparent during the course of the following description when taken in connection with the accompanying drawings.

In the drawings, wherein like numerals are employed to designate like parts throughout the same:

Fig. 1 is a plan view of a continuous type furnace having the novel apparatus of the invention associated therewith;

Fig. 2 is a fragmentary cross-sectional view taken along the lines 2—2 of Fig. 1;

Fig. 3 is a fragmentary longitudinal sectional view taken along the line 3—3 of Fig. 1;

Fig. 4 is a perspective view showing a portion of the interior of the furnace of Fig. 1 and the apparatus of the present invention;

Figure 5:
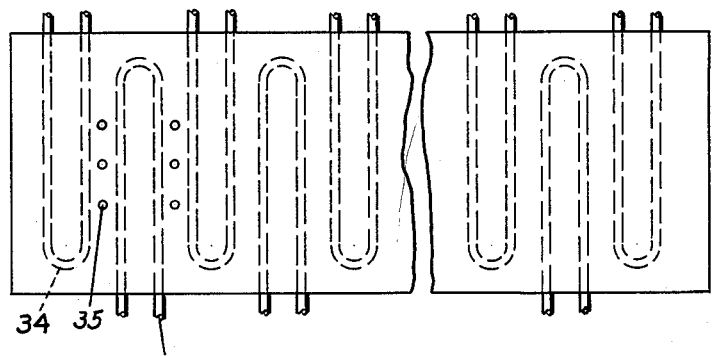
Fig. 5 is a schematic plan view of furnace heating means which may be used.

Briefly stated, the present invention comprises a novel method and apparatus for cleaning and bending glass sheets in pairs in which a pair of glass sheets are heated with sufficient heat being directed toward the surface of one of the sheets in a relatively short-time interval so as to cause a temperature differential to exist between the opposite sheet surfaces. This causes the hotter surface to expand for a greater distance and more rapidly than the other thus causing the sheet to bow in the direction of the hottest surface and creating a gap between the sheets through which a stream of gas, preferably air, is directed and contacts the adjacent facing surface of each of the sheets to sweep them clear of foreign material.

The apparatus for carrying out the method of the invention is shown in Figs. 1 to 4 and comprises a bending furnace 12 of the tunnel type having entry and exit openings and a continuous roller type conveyor 13 passed therethrough and adapted to convey bending molds 14 supporting a pair of glass sheets 15 and 16 to be bent into and through the furnace wherein the temperature of the sheets is gradually raised to bending temperature after which the sheets are bent into conformity with the mold shaping surface.

The type of mold used is not critical and, as shown in Fig. 4, may be of the usual multi-section type having a center section 17 and end sections 18 with the glass sheets being supported thereabove by resting upon the outermost ends of the mold end sections. Molds which have been found to be suitable are those disclosed in French Patents 1,097,088 and 1,124,919.

Furnaces of the type described herein are generally divided into at least two heating zones including an entry or preheat zone A in which the glass sheets are gradually brought to bending temperature, and a bending zone B of higher temperature in which the glass sheets are bent into conformity with the mold. The furnace 12 may be heated from either above or below the conveyor 13 by means of radiant heaters or it may be heated from both above and below the conveyor. Best results have been obtained when using furnaces of the type employing radiant roofs which, as shown in Fig. 3, comprise a plurality of relatively closely spaced radiant burners 19 forming a portion of the roof 20 of the furnace 12. A suitable furnace of this type is disclosed in French Patent 1,132,986.

Referring now specifically to Figs. 2 to 4, the cleaning apparatus includes a piping assembly 21 which is located in the rear of the furnace zone A immediately ahead of the bending zone B. The piping section 21 comprises upper and lower longitudinal pipe sections 22 and 23 connected together by intermediate transverse piping sections 24. At each of their opposite ends, the pipe sections 22 and 23, when in vertically aligned position as shown in Fig. 3, are bent forward and toward one another to be joined together by relatively short pipe sections 25 which also serve as axles for rotating the assembly 21 and are supported by bearings 26 disposed in the furnace side walls 27 and 28. The outermost end of one of the axles 25 is closed by a plug 29 whereas the other pipe axle 25 extends outwardly from the furnace and is bent to form a lever section 30 having a shut off valve 31 mounted therein and is connected to a suitable source of gas under pressure, such as air which may be supplied through a conduit 32 connected to the lever section 30. If desired, the air may be heated as by a heating coil 32a which is wrapped around the lever section 30 (Figs. 1 and 4). This air is heated so that the glass sheets will not be chilled.

To direct a substantially continuous gaseous stream between a pair of moving glass sheets, and in a direction opposite to their movement as will be later described in detail, the lower pipe section 23 is provided with a plurality of relatively closely spaced orifices 33 which extend across substantially the entire length of the section 23. Preferably the orifices are spaced at one inch centers and have diameters of $\frac{1}{16}$ inch.

In accordance with the method of the invention, the pair of glass sheets 15 and 16 are mounted upon a mold 14 and continuously passed transversely, or parallel to their short axes through the furnace 12 and are substantially continuously heated while passing through both the preheated and bending zones thereof. Upon travelling through the preheat zone A of the furnace, the sheets are continuously heated in such a manner that at least one of them bows away from the other to create a gap therebetween through which a substantially continuous elongated stream of gas from the orifices 33 is directed and contacts both facing surfaces of the sheets and sweeps them clear of foreign material. The furnace heat input as well as the location of the pipe assembly 21 in the furnace may be controlled so that immediately after passing by the assembly 21 the glass sheets, which are continuously subjected to heat, will have been sufficiently heated so that they close together and are at substantially bending temperature and begin to bend into conformity with the mold.

Prior to reaching the pipe assembly 21, the glass sheets 15 and 16, which as shown in Fig. 3 are supported at the ends thereof upon a mold 14, are separated from one another and thus tend to pick up a certain amount of foreign material within the furnace. By the time the sheets reach a position directly ahead of the pipe assembly they are still apart from one another so that a space or gap $a$ exists between the facing surfaces thereof. At this time, the pipe assembly is rotated from the horizontal position, shown in phantom lines in Fig. 3, to the vertical position at which time the orifices 33 in the lowermost pipe 23 are aligned with substantially the center of the gap $a$ between the glass sheets so that upon opening of the valve 31 by a furnace operator jets of air are emitted through the orifices 33 and pass between and in contact with the facing surface of the glass sheets in a plane substantially parallel thereto thus sweeping these surfaces clean of foreign material. It is usually sufficient if the air blast is only of one second or less duration but in some instances it is desirable to give the sheets two or three practically instantaneous air blasts which will not appreciably chill the sheets even if the air is not heated. The pipe assembly can then be rotated to the horizontal position to allow the mold to pass therebeneath and by proper control of the furnace temperature the sheets are sufficiently heated after passing beneath the pipe assembly that the upper sheet will resume its normal flat form thus preventing the entry of further foreign material between the pair of sheets and are sufficiently softened so as to sag into contact with the shaping surface of the mold 14.

The number of orifices in the lowermost pipe will of course determine the width of the blast of air. Preferably the distance between the endmost orifices is set to be greater than the width of any pair of glass sheets to be bent in the furnace so that the stream of gas issuing from the orifices will pass through the entire length of the gap between any pair of sheets.

Although a range of air pressure may be satisfactorily used to dislodge the foreign material from the surfaces of the sheets, it has been found preferable that air pressure in the lower pipe 23 be maintained between about 20 p.s.i. and 80 p.s.i. with 60 p.s.i. proving very satisfactory since such a pressure has been found sufficient to dislodge substantially all foreign matter and yet not disadvantageously disturb the heat pattern within the furnace nor disturb the position of the pair of glass sheets with respect to one another.

Figure 6:
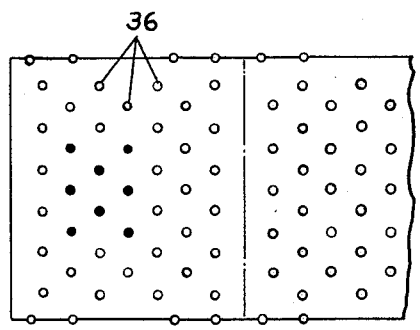
Fig. 6 is a view similar to Fig. 5 of a different type of furnace heating means.

It was previously mentioned that the sheets are heated in such a manner as to cause at least one of them to bow away from the other to create a gap therebetween. Preferably, the sheet so heated is the uppermost glass sheet, and there is shown in Figs. 5 and 6 partial schematic views of heating means which may be used within the furnace 12 above the conveyor 13 to direct radiant heat downwardly to heat the uppermost glass sheet. The type of heating system illustrated in Fig. 5 comprises a plurality of hair-pin type hollow metallic tubes 34 into one end of which a flame is directed to heat the tubes so that the outermost surface of the tubes radiates heat. Such tubes are usually positioned 12 inches or so beneath the top wall and are disposed over the path of the glass sheets. As a general rule, those tubes disposed in the preheat zone of the furnace would not be heated to a temperature sufficient to concentrate enough heat upon the uppermost sheet to cause this sheet to bow away from the other. However, in order to bow the sheet sufficient heat must be concentrated thereon so as to heat the uppermost sheet surface to a higher temperature than the lowermost surface in a relatively short amount of time so that the difference in temperatures between the two surfaces will cause the sheet to bow upwardly thus creating the gap between the sheets through which the blast of air is directed. Therefore, it is desirable to provide a series of cup type radiant burners 35 in the entry portion of the preheat zone so as to provide the additional heat. Suitable heat sources may be burners or radiators of the type disclosed in U.S. Patent 2,618,906, issued November 25, 1952 to F. O. Hess. Although the use of such burners is recommended, the first two or three tubes could be heated to a sufficiently high temperature but this would generally be found uneconomical since the tube life would be materially shortened.

Another heating arrangement for the furnace 12 is shown schematically in Fig. 6 and comprises rows of radiant burners 36 similar to the burners 35 located in the furnace roof. The rate of firing of the various burners may be controlled so that those burners adjacent the center of the furnace and the entry portion of the preheat zone A will concentrate a greater amount of heat than other burners. A suitable heat pattern is illustrated in Fig. 6 with the solid circles indicating burners firing at a relatively high rate and the open circles indicating burners firing at a relatively low rate.

Although it is preferred that the glass sheets be primarily heated from above, suitable heat sources may be provided in the side walls or adjacent the bottom wall of the furnace so that the lowermost surface of the lowermost glass sheet would be heated to a higher temperature than the uppermost surface so that the lower sheet bows downwardly. However, this is not too desirable since gravity acts against the lowermost sheet returning to its normal flat position as the sheet becomes uniformly heated and thus there is the possibility that the two sheets will not be in full contact with one another as they bend into contact with the mold shaping surface. Therefore, if heating means below the bending molds are utilized in the furnace it is preferable that a mold of the type shown in previously mentioned French Patent 1,097,088 be used since this mold has a shield or heat absorbing member located beneath the mold shaping surface which absorbs sufficient heat from the furnace atmosphere and thus retards the heating of the glass sheets with the lowermost sheet being most affected thereby. By using a heat absorber, not only is the bowing of the lower sheet retarded but also the bending thereof thus assuring that the two sheets bend downwardly while maintained substantially in full contact with one another.

It is also to be understood that the forms of the invention herewith shown and described are to be taken as preferred embodiments only of the same, and that various changes may be resorted to without departing from the spirit of the invention or the scope of the subjoined claims.

I claim:

1. In a method of cleaning a pair of glass sheets superimposed one upon the other in contacting relationship, the steps of directing heat against a surface of one of said sheets to heat said surface more rapidly than the other surface of said sheet whereby to cause said sheet to bow in the direction of said first mentioned surface to leave a gap between said sheets, and directing a gas through the gap between the sheets to remove foreign particles on the facing sheet surfaces.

2. In a method of cleaning a pair of glass sheets as defined in claim 1, wherein the sheets are moved along a definite path through a furnace while being heated, and the gas is directed toward the sheets in a direction opposite to said path of sheet movement.

3. In a method of cleaning a pair of glass sheets as defined in claim 1, wherein radiant heat is directed downwardly against the upper surface of the uppermost sheet.

4. In a method of cleaning a pair of glass sheets as defined in claim 3, wherein the gas is directed through the gap along the entire length thereof.

5. In a method of cleaning and bending a pair of flat glass sheets superimposed one upon the other in contacting relationship, the steps of supporting the sheets at opposite ends thereof while directing radiant heat toward a surface of one of the sheets to heat said surface more rapidly than the other surface of said sheet whereby to cause said sheet to bow in the direction of said first mentioned sheet surface to leave a gap between said sheets, directing a gas through the gap between the sheets to remove foreign particles on the facing sheet surfaces, directing additional radiant heat toward said bowed sheet until said sheet is substantially evenly heated and returns to its original shape, continuing to direct radiant heat toward said sheet until both sheets reach bending temperature, and then bending said sheets into conformity with a bending mold.

6. A method of cleaning and bending a pair of glass sheets into conformity with a mold, said sheets being superimposed one upon the other in contacting relationship, comprising conveying a mold having a pair of sheets mounted thereabove through a furnace while heating the outermost surface of at least one sheet of said pair of sheets to a higher temperature more rapidly than the innermost surface of said sheet whereby said sheet will bow in the direction of said outermost sheet surface and will leave a gap between the sheets, directing a gas through the gap between the sheets to remove foreign particles on the facing sheet surfaces, continuing the heating of the sheets until the bowed sheet is substantially evenly heated and substantially returns to its original shape, and further heating the sheets to bend said sheets into conformity with the mold.

7. A method of cleaning and bending a pair of glass sheets as defined in claim 6, wherein the pair of sheets is conveyed transversely through the furnace, and the gas is directed in a path opposed to the direction of movement of the pair of sheets and through substantially the entire length of the gap between said sheets.

8. A method of cleaning and bending a pair of glass sheets superimposed one upon the other in contacting relationship, comprising conveying a pair of superimposed sheets of glass mounted above a bending mold along a path through a furnace, directing radiant heat toward the uppermost surface of the upper sheet of glass to cause said uppermost surface of said upper sheet to be heated to a higher temperature more rapidly than the innermost surface of the same sheet whereby said sheet will bow in the direction of said uppermost sheet surface and will leave a gap between said sheets, directing a gas through the gap between said sheets to remove foreign particles on the facing sheet surfaces, and directing additional radiant heat toward the uppermost sheet of glass until both sheets reach bending temperature and sag into conformity with the mold.

9. A method of cleaning and bending a pair of glass sheets as defined in claim 8, including retarding the heating of the lowermost glass sheet.

10. A method of cleaning and bending a pair of glass sheets as defined in claim 8, including heating the gas.

11. A method of cleaning and bending a pair of glass sheets as defined in claim 8, wherein the gas is directed in a substantially continuous stream through substantially the entire length of the gap between the sheets.

12. A method of cleaning and bending a pair of glass sheets moving along said path as defined in claim 8, wherein the sheets are supported in the plane defined by said path, and the gas is directed in an elongated stream disposed substantially parallel to said plane.

13. In apparatus for cleaning and bending glass sheets, the combination of a furnace having an entrance opening and an exit opening, a bending mold for supporting a pair of glass sheets to be bent thereon in contacting relationship with one another, a conveyor for moving said bending mold and sheets through the furnace, heating means including radiant heat sources disposed within said furnace to heat the outermost surface of the uppermost sheet of said pair of sheets to a higher temperature more rapidly than the innermost surface of the same sheet of said pair whereby to cause said sheet to bow in the direction of said outermost sheet surface to leave a gap between said pair of sheets, and gas emitting means positioned within the furnace and spaced from the entrance end thereof a sufficient distance that the uppermost sheet has bowed when proximate to said means thus leaving a gap between the sheets, said gas emitting means being positioned within the furnace so as to direct a stream of gas through the gap between said sheets to remove foreign particles on the facing sheet surfaces.

14. In apparatus for cleaning and bending glass sheets as defined in claim 13, wherein the gas emitting means comprises a conduit disposed transversely within the furnace and having a plurality of gas emitting orifices.

15. A method of cleaning a pair of glass sheets superimposed one upon the other in contacting relationship, including the steps of establishing a heated atmosphere adjacent the outermost surface of at least one of said sheets of said pair to heat said outermost surface to a higher temperature more rapidly than the innermost surface of the same sheet whereby to cause said sheet to bow in the direction of said outermost sheet surface leaving a gap between said pair of sheets, and directing a gas through said gap to remove foreign particles on the facing sheet surfaces.

16. A method as defined in claim 15, including establishing a heated atmosphere adjacent the outermost surfaces of both sheets of said pair of sheets whereby both of said sheets will bow in the direction of their respective outermost surfaces.

17. A method as defined in claim 15, including introducing the pair of superimposed sheets into the heated atmosphere rapidly to insure quick development of the temperature differential between opposite sheet surfaces.

References Cited in the file of this patent

UNITED STATES PATENTS

| | | |
|---|---|---|
| 2,377,849 | Binkert | June 12, 1945 |
| 2,486,153 | Gwyn | Oct. 25, 1949 |
| 2,697,676 | Black et al. | Dec. 21, 1954 |
| 2,713,011 | Durst | July 12, 1955 |
| 2,725,320 | Atkeson et al. | Nov. 29, 1955 |